(12) United States Patent
Tamaki et al.

(10) Patent No.: US 9,399,689 B2
(45) Date of Patent: *Jul. 26, 2016

(54) METHOD FOR PRODUCING POLYBUTADIENE, POLYBUTADIENE, RUBBER COMPOSITION AND TIRE

(71) Applicant: BRIDGESTONE CORPORATION, Chuo-ku, Tokyo (JP)

(72) Inventors: Satoru Tamaki, Kodaira (JP); Olivier Tardif, Wako (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/406,603

(22) PCT Filed: Jun. 18, 2013

(86) PCT No.: PCT/JP2013/003796
§ 371 (c)(1),
(2) Date: Dec. 9, 2014

(87) PCT Pub. No.: WO2014/006830
PCT Pub. Date: Jan. 9, 2014

(65) Prior Publication Data
US 2015/0183904 A1   Jul. 2, 2015

(30) Foreign Application Priority Data

Jul. 4, 2012  (JP) ................................. 2012-150326

(51) Int. Cl.
 C08F 136/06  (2006.01)
 C08F 36/06  (2006.01)
 C08F 4/54  (2006.01)
 B60C 1/00  (2006.01)

(52) U.S. Cl.
CPC .................. *C08F 136/06* (2013.01); *B60C 1/00* (2013.01); *C08F 36/06* (2013.01)

(58) Field of Classification Search
CPC .............. C08F 4/52; C08F 4/54; C08F 4/545; C08F 36/00; C08F 36/04; C08F 36/06
See application file for complete search history.

(56) References Cited

U.S. PATENT DOCUMENTS

| 4,533,711 A * | 8/1985 | Takeuchi et al. ........... 526/340.4 |
| 4,906,706 A * | 3/1990 | Hattori et al. ............... 525/343 |
| 2008/0114136 A1 * | 5/2008 | Suzuki et al. ............... 526/161 |
| 2009/0043046 A1 * | 2/2009 | Luo et al. ................... 525/54 |
| 2011/0263803 A1 * | 10/2011 | Suzuki et al. ............... 526/127 |
| 2012/0123070 A1 | 5/2012 | Boisson et al. |

FOREIGN PATENT DOCUMENTS

| CN | 1222532 A | 7/1999 |
| CN | 102245647 A | 11/2011 |
| EP | 2371867 A1 | 10/2011 |
| EP | 2840095 A1 | 2/2015 |
| JP | 2005-530872 A | 10/2005 |
| JP | 2007-161918 A | 6/2007 |
| JP | 2007161918 A * | 6/2007 |
| JP | 2012-131965 A | 7/2012 |
| WO | 03033545 A2 | 4/2003 |
| WO | 2010/074255 A1 | 7/2010 |
| WO | 2010/125072 A1 | 11/2010 |
| WO | 2012/014421 A1 | 2/2012 |
| WO | 2012/014463 A1 | 2/2012 |

OTHER PUBLICATIONS

Machine translated English language equivalent of JP 2007-161918 (Jun. 2007, 8 pages).*
International Search Report of PCT/JP2013/003796 dated Aug. 20, 2013.
Communication dated Oct. 27, 2015 from the State Intellectual Property Office of the People's Republic of China in counterpart Application No. 201380035531.8.
Woodman et al., "Heterogenized 'Ligand-Free' Lanthanide Catalysts for the Homo- and Copolymerization of Ethylene and 1,3-Butadiene", Macromolecules, 2005, vol. 38, No. 8, pp. 3060-3067, XP-001227419.

* cited by examiner

*Primary Examiner* — Brieann R Fink
(74) *Attorney, Agent, or Firm* — Sughrue Mion, PLLC

(57) ABSTRACT

The present invention provides a method for synthesizing a polybutadiene more efficiently and stably which is possible to obtain a rubber composition and a tire excellent in durability (fracture resistance, wear resistance and crack growth resistance). A method for producing a polybutadiene, where a butadiene monomer is polymerized with the existence of rare-earth element compounds represented by the following formula (i):

$$M\text{-}(NQ)^1(NQ)^2(NQ)^3 \qquad (i)$$

(in the formula, M is at least one selected from lanthanides, scandium and yttrium; $(NQ)^1$, $(NQ)^2$ and $(NQ)^3$ are amide groups which may be the same or different to each other, and have M-N bonds).

8 Claims, No Drawings

METHOD FOR PRODUCING POLYBUTADIENE, POLYBUTADIENE, RUBBER COMPOSITION AND TIRE

CROSS REFERENCE TO RELATED APPLICATIONS

This is a National Stage of International Application No. PCT/JP2013/003796 filed Jun. 18, 2013, claiming priority based on Japanese Patent Application No. 2012-150326 filed Jul. 4, 2012, the contents of all of which are incorporated herein by reference in their entirety.

TECHNICAL FIELD

The present invention relates to a method for producing a polybutadiene, a polybutadiene produced with the method, a rubber composition applying the polybutadiene and a tire applying the rubber composition.

BACKGROUND ART

Recently, on the basis of the societal demand of resource-saving and energy-saving, a request for a lower fuel consumption of automobiles is growing gradually, and a tire which is excellent in wear resistance, crack growth resistance, etc. is in demand. It is known that it is possible to improve the durability of the tire by stereoregularly controlling the micro structure of rubber components compound to the tire.

On the other hand, it is known that natural rubber has a micro structure where the cis-1,4 bonding amount is 99.7%, and it is recognized that the strain-induced crystallizability is improved due to the high stereoregularity. Regarding the rubber composition using the natural rubber, it may exhibit high durability when used for a tire. On the other hand, it is known that it is also possible to improve the durability by stereoregularly controlling the micro structure of polybutadiene.

It is disclosed in JP2005-530872A (PTL1) that it is possible to synthesize a polybutadiene with a high cis-1,4 bonding amount by using a catalyst system obtained by adding conjugated diene monomer to neodymium compounds. However, a catalyst synthesis process is necessary in order to use the neodymium compounds used in PTL1 as a catalyst. Therefore, problems such as that it is time-consuming to obtain polybutadiene, etc. are still remaining.

CITATION LIST

Patent Literature

PTL 1: JP 2005-530872 A

SUMMARY OF INVENTION

Technical Problem

An object of the present invention is to provide a method for synthesizing a polybutadiene more efficiently which is possible to obtain a rubber composition and a tire excellent in durability (fracture resistance, wear resistance and crack growth resistance), and in addition, to provide a rubber composition and a tire using the rubber composition excellent in durability (fracture resistance, wear resistance and crack growth resistance).

Solution to Problem

Primary features of the present invention in order to achieve the above objects are as follow. Namely, according to an aspect of the method for producing a polybutadiene of the present invention, a butadiene monomer is polymerized with the existence of rare-earth element compounds represented by the following formula (i):

(in the formula, M is at least one selected from lanthanides, scandium and yttrium, and $(NQ)^1$, $(NQ)^2$ and $(NQ)^3$ are amide groups, which may be the same or different, and have M-N bonds). According to the method, it is possible to produce the polybutadiene efficiently without the need for an isolation process of the catalyst composition. The method of the present invention is possible to form a catalyst composition having a high stability of the catalyst itself by using rare-earth element compounds comprising nitrogen atom as a catalyst. In this way, an isolation process of the catalyst composition may be omitted, and thus the yield of catalyst is increased, and it becomes possible to produce the polybutadiene efficiently.

Further, the "rare-earth element compounds" in the present specification represents compounds comprising scandium, yttrium or lanthanides consisting of elements with an atomic number 57 to 71 in the Periodic Table.

In addition, the "polybutadiene" in the present specification refers to a homopolymer of butadiene obtained by polymerizing (synthesizing) butadiene as a monomer, and comprises the product obtained by degenerating a part of the macromolecular chain of a polymer.

According to an aspect of the method for producing the polybutadiene of the present invention, it is preferable that the butadiene monomer is further polymerized with the existence of an Additive D which may be an anionic ligand. It is possible to synthesize the polybutadiene with a high cis-1,4 bonding amount at a high yield by adding the Additive D.

In an aspect of the method of the present invention, it is preferable that the butadiene monomer is polymerized with the existence of at least one selected from ionic compounds and halogen compounds, and compounds represented by the following general formula (X), in addition to the rare-earth element compounds and Additive D:

(in the formula, Y is a metallic element selected from Group 1, Group 2, Group 12 and Group 13 of the Periodic Table, $R^1$ and $R^2$ are hydrocarbon group having 1 to 10 carbon atoms or hydrogen atom, $R^3$ is a hydrocarbon group having 1 to 10 carbon atoms, where $R^1$, $R^2$ and $R^3$ may be the same or different from each other; in addition, in the case that Y is a metallic element selected from Group 1 of the Periodic Table, a=1 and b, c=0; in the case that Y is a metallic element selected from Group 2 and Group 12 of the Periodic Table, a, b=1 and c=0; and in the case that Y is a metallic element selected from Group 13 of the Periodic Table, a, b, c=1).

Ionic compounds, halogen compounds and compounds represented by formula (X) bring promotion effect to the polymerization reaction as cocatalysts to the aforementioned catalyst composition.

The compounding ratio of Additive D is preferably 0.1 mol or more to less than 10 mol with respect to 1 mol of the rare-earth element compounds. By setting the compounding molar ratio of the Additive D to be 0.1 mol or more with respect to 1 mol of the rare-earth element compounds, it is possible to produce the polybutadiene with high cis and high molecular weight. In addition, according to the present invention, the yield of the catalyst composition is high, and consequently, even when the compounding amount of Additive D is less than 1 mol, it is still possible to produce the polybutadiene with sufficiently high cis and molecular weight. In this way, it is possible to reduce the material cost.

Further, the effect remains almost unchanged even in the case of setting the compounding amount of Additive D to be the same or more in mol number.

The Additive D is preferable to have at least one selected from OH group, SH group and NH group. In addition, in order to further improve the stability of the catalyst, the Additive D is preferably an anionic tridentate ligand precursor.

The polymerization reaction of the aforementioned rare-earth element compounds, Additive D, cocatalysts and butadiene monomer is preferably performed in cyclohexane, normal hexane or a mixture thereof as a solvent. By setting the solvent to be cyclohexane, normal hexane or a mixture thereof, there would be an advantage that the purification step becomes easy and environmentally friendly. In addition, there is also an advantage that these solvents are easy to obtain.

The polybutadiene of the present invention may be produced with any one of the aforementioned aspects of the method, whereof the 1,2-vinyl bonding amount is preferably no more than 2%.

Further, as used herein, "1,2-vinyl bonding amount" refers to the ratio of 1,2-vinyl structure with respect to the polybutadiene in total. In the present specification, the same goes with the "cis-1,4 bonding amount" and the "trans-1,4 bonding amount".

The tire of the present invention has a rubber composition which comprises the aforementioned polybutadiene as a rubber component and rubber members using the rubber composition. By comprising at least the polybutadiene of the present invention, it is possible to obtain a rubber composition with a significantly increased strain-induced crystallizability and an excellent durability (fracture resistance, wear resistance and crack growth resistance). In this way, it is possible to produce a tire excellent in durability (fracture resistance, wear resistance and crack growth resistance).

Advantageous Effect of Invention

The present invention is possible to provide a method for synthesizing a polybutadiene more efficiently and stably which is possible to obtain a rubber composition and a tire excellent in durability (fracture resistance, wear resistance and crack growth resistance). In addition, it is possible to obtain a rubber composition and a tire using the rubber composition excellent in durability (fracture resistance, wear resistance and crack growth resistance).

DESCRIPTION OF EMBODIMENTS

The present invention is exemplified based on the embodiments as follows.
(Polybutadiene)
The polymer produced with the method of the present invention is a polybutadiene.
—Cis-1,4 Bonding Amount—
The cis-1,4 bonding amount of the polybutadiene is not specifically limited and may be selected appropriately depending on the purpose, yet is preferably 95% or more, more preferably 97% or more, and even more preferably 98% or more.

By setting the cis-1,4 bonding amount to be 95% or more, the orientation of the polymer chain would be improved, and the generation of strain-induced crystallizability would become sufficient; further, by setting the same to be 98% or more, it is possible to generate a sufficient strain-induced crystallizability to obtain a higher durability.

—Trans-1,4 Bonding Amount—
The trans-1,4 bonding amount of the polybutadiene is not specifically limited and may be selected appropriately depending on the purpose, yet is preferably 5% or less, more preferably 3% or less, and even more preferably 1% or less.

By setting the trans-1,4 bonding amount to be 5% or less, the strain-induced crystallizability would become less vulnerable to interference.

—1,2-Vinyl Bonding Amount—
—1,2-Vinyl Bonding Amount—
The 1,2-vinyl bonding amount of the polybutadiene is preferably 2% or less, and more preferably 1% or less.

By setting the 1,2-vinyl bonding amount to be 2% or less, the strain-induced crystallizability would become less vulnerable to interference.

—Number Average Molecular Weight (Mn)—
The number average molecular weight (Mn) of the polybutadiene is preferably set 400,000 or more, and more preferably set 500,000 or more.

(Method for Producing Polybutadiene)
The method of the present invention which is possible to produce the polybutadiene is described in detail as follows. The method described in detail as follows is no more than an exemplification.

The method for producing the polybutadiene comprises at least a polymerization process, and processes appropriately selected depending on the purpose, such as coupling process, cleaning process, etc.

—Polymerization Process—
The polymerizing process in the present invention is a process for polymerizing butadiene monomer.

In the polymerization process, besides using the following polymerization catalyst composition, it is also possible to polymerize butadiene which is monomer similarly to ordinary methods for producing polymers with coordinated ionic polymerization catalyst. The polymerization catalyst composition used in the present invention is described as follows.

As the polymerization method, any one selected from solution polymerization, suspension polymerization, liquid phase bulk polymerization, emulsion polymerization, gas phase polymerization process, solid phase polymerization, etc. may be used. In addition, in the case of using a solvent in the polymerization reaction, the used solvent may be any type that is inactive in the polymerization reaction. For example, normal hexane, toluene, cyclohexane or a mixture thereof are included, and in view of the environmental load and the cost, cyclohexane, normal hexane or a mixture are preferably used. Further, in view of the advantage of a lower boiling point than toluene and a lower toxicity, cyclohexane is preferably used.

In the case of using a polymerization catalyst composition, the polymerizing process may, for example, (1) in a polymerization reaction system comprising butadiene which is a monomer, provide the components of the polymerization catalyst composition separately as the polymerization catalyst composition in the reaction system; (2) provide a polymerization catalyst composition prepared beforehand to the polymerization reaction system. In addition, the case of providing metallocene complex (active species) activated with a cocatalyst is included in (2).

In addition, in the polymerizing process, a polymerization terminator such as methanol, ethanol, isopropanol, etc. may be used to terminate the polymerization.

In the polymerizing process, the polymerization reaction of butadiene is preferably performed in an atmosphere of inactive gas, preferably nitrogen gas or argon gas. The polymerization temperature of polymerization reaction is not specifically limited, but is preferably selected in the range of −100° C. to 200° C., and may also be set to around room temperature. Further, if the polymerization temperature is raised, the cis-1,4 selectivity of the polymerization reaction may be reduced. In addition, in order to bring sufficient butadiene into the polymerization reaction system, the pressure of the polymerization reaction is preferably 0.1 to 10.0 MPa. In addition, the reaction time of the polymerization reaction is not specifically limited, and is preferably, for example, 1 second to 10 days, which may also be selected appropriately according to conditions such as catalyst type and polymerization temperature.

—Polymerization Catalyst Composition—

The polymerization catalyst composition is described as follows.

In addition, the polymerization catalyst composition comprises at least:

Component (A): rare-earth element compounds represented by the following formula (i):

$$M\text{-}(NQ)^1(NQ)^2(NQ)^3 \qquad (i)$$

(in the formula, M is at least one selected from lanthanides, scandium and yttrium; $(NQ)^1$, $(NQ)^2$ and $(NQ)^3$ are amide groups which may be the same or different to each other, and have M-N bonds).

The polymerization catalyst composition preferably comprises:

Component (B): at least one selected from ionic compounds and halogen compounds, and more preferably at least one selected from ionic compounds (B-1) comprising non-coordinating anions and cations, and halogen compounds (B-3) of at least one selected from organic compounds comprising active halogen and complex compounds of Lewis base and metal halide, and Lewis acid. Further, aluminoxane (B-2) may also be comprised if necessary.

In addition, the polymerization catalyst composition preferably comprises:

Component (C): a compound represented by the following general formula (X):

$$YR^1{}_aR^2{}_bR^3{}_c \qquad (X)$$

(in the formula, Y is a metallic element selected from Group 1, Group 2, Group 12 and Group 13 of the Periodic Table, $R^1$ and $R^2$ are hydrocarbon group having 1 to 10 carbon atoms or hydrogen atom, and $R^3$ is a hydrocarbon group having 1 to 10 carbon atoms; $R^1$, $R^2$ and $R^3$ may be the same or different to each other. In addition, in the case that Y is a metallic element selected from Group 1 of the Periodic Table, a=1 and b, c=0; in the case that Y is a metallic element selected from Group 2 and Group 12 of the Periodic Table, a, b=1 and c=0; in the case that Y is a metallic element selected from Group 13 of the Periodic Table, a, b, c=1).

Further, in the case that the polymerization catalyst composition comprises at least one selected from the aforementioned ionic compound (B-1) and the aforementioned halogen compound (B-3), it is necessary to further comprise Component (C).

Further, the polymerization catalyst composition is preferable to comprise an Additive D which may be an anionic ligand.

The aforementioned Component (A) consists of compounds having three M-N bonds. Here, with the Component (A) having three M-N bonds, there is an advantage that the structure is stable due to the chemical equivalence of each bond, and thus is easy to handle.

In the aforementioned formula (i), the amide groups represented by NQ may be aliphatic amide groups such as dimethyl amide group, diethyl amide group, diisopropyl amide group, etc., aryl amide groups such as phenyl amide group, 2,6-di-tert-butylphenyl amide group, 2,6-diisopropylphenyl amide group, 2,6-dineopentyl phenyl amide group, 2-tert-butyl-6-isopropylphenyl amide group, 2-tert-butyl-6-neopentyl phenyl amide group, 2-isopropyl-6-neopentyl phenyl amide group, 2,4,6-tert-butylphenyl amide group, etc., and bistrialkylsilylamide groups such as bistrimethylsilylamide group, and, among these, preferred is bistrimethylsilylamide group.

Further, in the polymerization reaction system, the concentration of Component (A) in the polymerization catalyst composition is preferably within the range of 0.1 to 0.0001 mol/L.

Component (A) used in the aforementioned polymerization catalyst composition is a rare-earth element compound or a reactant of the rare-earth element compound and Lewis base. There is an advantage that the rare-earth element compound and the reactant thereof do not have a rare-earth element-carbon bond, and therefore the compound is stable and easy to handle. Here, rare-earth element compounds refer to compounds comprising lanthanides consisting of elements with an atomic number 57 to 71 in the Periodic Table, or scandium or yttrium.

Further, as specific examples of lanthanides, lanthanum, cerium, praseodymium, neodymium, promethium, samarium, europium, gadolinium, terbium, dysprosium, holmium, erbium, thulium, ytterbium and lutetium are included. And the aforementioned Component (A) may be used singly or in a combination of two or more.

In the Component (A) which may be used as the aforementioned polymerization catalyst composition, the Lewis base which reacts with the rare-earth element compounds may be, for example, tetrahydrofuran, diethyl ether, dimethyl aniline, trimethylphosphine, lithium chloride, neutral olefins, neutral diolefins, etc.

The Component (B) used as the aforementioned polymerization catalyst composition is at least one compound selected from the group of ionic compounds (B-1) and halogen compounds (B-3). Further, in consideration of the environmental aspect, comparing with halogen compounds (B-3), ionic compounds (B-1) are more preferably used. Further, aluminoxane (B-2) may also be comprised as Component (B) if necessary. The content in total of Component (B) in the aforementioned polymerization catalyst composition is preferably 0.1 to 50 fold molar comparing to Component (A).

The ionic compound represented by the aforementioned (B-1) comprises non-coordinating anions and cations, and includes ionic compounds which may generate cationic transition metal compounds by reacting with rare-earth element compounds or the reactants thereof with Lewis base which corresponds to the aforementioned Component (A). Here, the non-coordinating anion may be tetravalent boron anions, for example, tetraphenyl borate, tetrakis(monofluorophenyl)borate, tetrakis(difluorophenyl)borate, tetrakis(trifluorophenyl)borate, tetrakis(tetrafluorophenyl)borate, tetrakis(pentafluorophenyl)borate, tetrakis(tetrafluoromethylphenyl)borate, tetra(tolyl)borate, tetra(xylyl)borate, (triphenyl,pentafluorophenyl)borate, [tris(pentafluorophenyl)phenyl]borate, tridecahydride-7,8-dicarbaundecaborate, etc. On the other hand, the cation may be carbonium cation, oxonium cation, ammonium cation, phosphonium cation, cycloheptatrienyl cation, ferrocenium cation having transition metals, etc. As specific examples of the carbonium cation, trisubstituted carbonium cations, etc. such as triphenylcarbonium cation, tri (substituted phenyl)carbonium cation, etc. are included, and specifically as the tri(substituted phenyl)carbonyl cation, tri (methylphenyl)carbonium cation, tri(dimethylphenyl)carbonium cation, etc are included. As specific examples of ammonium cation, trialkylammonium cations such as trimethylammonium cation, triethylammonium cation, tripropylammonium cation, tributylammonium cation (for example, tri(n-butyl)ammonium cation), etc.; N,N-dialkylanilinium cations such as N,N-dimethylanilinium cation, N,N-diethylanilinium cation, N,N-2,4,6-pentamethylanilinium cation; and dialkylammonium cations such as diisopropylammonium cation, dicyclohexylammonium cation, etc. are included. As specific examples of phosphonium cations, triarylphosphonium cations, etc. such as triphenylphosphonium cation, tri(methylphenyl)phosphonium cation, tri(dimethylphenyl)phosphonium cation, etc. are included. Therefore, the ionic compound is preferably a compound with ions selected and combined respectively from the aforementioned non-coordinating anions and cations, specifically N,N-dimethylanilinium tetrakis(pentafluorophenyl)borate, triphenylcarbonium tetrakis(pentafluorophenyl)borate, etc. In addition, these ionic compounds may be used singly or in a combination of two or more. Further, the content of the ionic compound in the aforementioned polymerization catalyst composition is preferably 0.1 to 10 fold molar comparing to Component (A), and more preferably about 1 fold molar.

The aluminoxane represented by the aforementioned (B-2) is a compound obtained by having an organic aluminum compound and a condensing agent contact with each other, for example, a linear aluminoxane or a circular aluminoxane having a repeating unit represented by the general formula: (—Al(R')O—) (in the formula, R' is a hydrocarbon group with 1 to 10 carbon atoms, where a part of the hydrocarbon group may be substituted with halogen atom and/or alkoxy group, and the degree of polymerization of the repeating unit is preferably 5 or more, and more preferably 10 or more). Here, R' may be specifically methyl group, ethyl group, propyl group, isobutyl group, etc., among which methyl group is preferable. In addition, the organic aluminum compound used as a material of aluminoxane may be a trialkyl aluminum such as trimethyl aluminum, triethyl aluminum, triisobutyl aluminum, etc., or a mixture thereof, and is particularly preferably trimethyl aluminum. For example, aluminoxane using a mixture of trimethyl aluminum and tributyl aluminum as a material may be preferable used. Further, the content of aluminoxane in the aforementioned polymerization catalyst composition is preferable to have a elemental ratio Al/M of the rare-earth element M comprised in Component (A) and aluminum element Al in aluminoxane of about 10 to 1000.

The halogen compound represented by the aforementioned (B-3) consists of at least one of an organic compound comprising active halogen and complex compounds of Lewis base and metal halide, and Lewis acid, and may, for example, react with the rare-earth element compounds or the reactant with Lewis base thereof, which corresponds to the aforementioned Component (A), and generate cationic transition metal compounds, halogenated transition metal compounds or compounds with a charge-deficient transition metal center. In particular, in consideration of the stability in the air, a complex compound of metal halide and Lewis base, rather than Lewis acid, is preferably used as the halogen compound of (B-3). Further, the content in total of the halogen compound in the aforementioned polymerization catalyst composition is preferably 1 to 5 fold molar comparing to Component (A).

As the aforementioned Lewis acid, halogen compounds comprising boron such as $B(C_6F_5)_3$, etc., halogen compounds comprising aluminum such as $Al(C_6F_5)_3$, etc., and also halogen compounds comprising elements belonging to Group 3, 4, 5, 6 or Group 8 of the Periodic Table may be used. Preferably, aluminum halides or organic metal halides may be used. In addition, as the halogen element, chlorine and bromine are preferable. As the aforementioned Lewis acid, in particular, methylaluminum dibromide, methylaluminum dichloride, ethylaluminum dibromide, ethylaluminum dichloride, butylaluminum dibromide, butylaluminum dichloride, dimethylaluminum bromide, dimethylaluminum chloride, diethylaluminum bromide, diethylaluminum chloride, dibutylaluminum bromide, dibutylaluminum chloride, methylaluminum sesquibromide, methylaluminum sesquichloride, ethylaluminum sesquibromide, ethylaluminum sesquichloride, dibutyltin dichloride, aluminum tribromide, antimony trichloride, antimony pentachloride, phosphorus trichloride, phosphorus pentachloride, tin tetrachloride, titanium tetrachloride, tungsten hexachloride, etc. may be used, among which diethyl aluminum chloride, ethyl aluminum sesquichloride, ethyl aluminum dichloride, diethyl aluminum bromide, ethyl aluminum sesquibromide and ethylaluminum dibromide are particularly preferable. In the case as above of using halogen compounds, compounds comprising 2 or more halogen atoms in one compound have better reactivity whereof the use amount may be reduced comparing to compounds having only one halogen atom, and is thus preferably used. For example, ethylaluminum dichloride is preferably used comparing to ethylaluminum chloride.

As the metal halide constituting complex compounds of the aforementioned metal halide and Lewis base, beryllium chloride, beryllium bromide, beryllium iodide, magnesium chloride, magnesium bromide, magnesium iodide, calcium chloride, calcium bromide, calcium iodide, barium chloride, barium bromide, barium iodide, zinc chloride, zinc bromide, zinc iodide, cadmium chloride, cadmium bromide, cadmium iodide, mercury chloride, mercury bromide, mercury iodide, manganese chloride, manganese bromide, manganese iodide, rhenium chloride, rhenium bromide, rhenium iodide, copper chloride, copper iodide, silver chloride, silver bromide, silver iodide, gold chloride, gold iodide, gold bromide, etc. may be used, among which magnesium chloride, calcium chloride, barium chloride, manganese chloride, zinc chloride, copper chloride are preferable, and magnesium chloride, manganese chloride, zinc chloride and copper chloride are particularly preferable.

In addition, as the Lewis base constituting the aforementioned complex compound of metal halide and Lewis base, phosphorus compounds, carbonyl compounds, nitrogen compounds, ether compounds, alcohol, etc. are preferably used. In particular, tributyl phosphate, tris(2-ethylhexyl)phosphate, triphenyl phosphate, tricresyl phosphate, triethylphosphine, tributylphosphine, triphenylphosphine, diethylphosphinoethane, diphenylphosphinoethane, acetylacetone, benzoylacetone, propionitrileacetone, valerylacetone, ethylacetylacetone, methyl acetoacetate, ethyl acetoacetate, phenyl acetoacetate, dimethyl malonate, diethyl malonate, diphenyl malonate, acetic acid, octanoic acid, 2-ethylhexanoic acid, oleic acid, stearic acid, benzoic acid, naphthenic acid, versatic acid, triethylamine, N,N-dimethylacetamide, tetrahydrofuran, diphenyl ether, 2-ethylhexyl alcohol, oleyl alcohol, stearyl alcohol, phenol, benzyl alcohol, 1-decanol, lauryl alcohol, etc. may be used, among which tris(2-ethylhexyl) phosphate, tricresyl phosphate, acetylacetone, 2-ethylhexanoic acid, versatic acid, 2-ethylhexyl alcohol, 1-decanol, lauryl alcohol are preferable.

The aforementioned Lewis base is subjected to the reaction at a ratio of 0.01 to 30 mol, preferably 0.5 to 10 mol with respect to 1 mol of the aforementioned metal halide. By using the reactant with the Lewis base, it is possible to reduce the metal remained in the polymer.

As the organic compound comprising the aforementioned active halogen, benzyl chloride, etc. may be used.

The aforementioned polymerization catalyst composition (C) is preferably an organic metal compound represented by the following general formula (X):

$$YR^1_a R^2_b R^3_c \qquad (X)$$

(in the formula, Y is a metallic element selected from Group 1, Group 2, Group 12 and Group 13 of the Periodic Table, $R^1$ and $R^2$ are hydrocarbon group having 1 to 10 carbon atoms or hydrogen atom, $R^3$ is a hydrocarbon group having 1 to 10 carbon atoms, where $R^1$, $R^2$ and $R^3$ may be the same or different from each other; in addition, in the case that Y is a metallic element selected from Group 1 of the Periodic Table, a=1 and b, c=0; in the case that Y is a metallic element selected from Group 2 and Group 12 of the Periodic Table, a, b=1 and c=0; and in the case that Y is a metallic element selected from Group 13 of the Periodic Table, a, b, c=1), and is preferably an organic aluminum compound represented by the following general formula (Xa):

$$AlR^1R^2R^3 \qquad (Xa)$$

(in the formula, $R^1$ and $R^2$ may be the same or different, including hydrocarbon groups having 1 to 10 carbon atoms or hydrogen atom, $R^3$ is a hydrocarbon group having 1 to 10 carbon atoms, and $R^3$ may be the same as or different from the aforementioned $R^1$ or $R^2$). As the organic aluminum compound in general formula (X), trimethyl aluminum, triethyl aluminum, tri-n-propyl aluminum, triisopropyl aluminum, tri-n-butyl aluminum, triisobutyl aluminum, tri-t-butyl aluminum, tripentyl aluminum, trihexyl aluminum, tricyclohexyl aluminum, trioctyl aluminum; diethylaluminum hydride, di-n-propyl aluminum hydride, di-n-butyl aluminum hydride, diisobutyl aluminum hydride, dihexyl aluminum hydride, diisohexyl aluminum hydride, dioctyl aluminum hydride, diisooctyl aluminum hydride; ethyl aluminum dihydride, n-propyl aluminum dihydride, isobutyl aluminum dihydride may be used, among which triethyl aluminum, triisobutyl aluminum, diethylaluminum hydride, diisobutyl aluminum hydride are preferable. In addition, the aforementioned aluminum compound used as Component (C) may be used singly or in a combination of two or more. Further, the content of the organic aluminum compound in the aforementioned polymerization catalyst composition is preferably 1 to 50 fold molar comparing to Composition (A), and more preferably about 10 fold molar.

—Additive D which May be an Anionic Ligand—

By adding additive D which may be an anionic ligand, it is possible to synthesize the polybutadiene with a higher cis-1,4 bonding amount at a high yield, which is thus preferable.

The aforementioned additive D is not specifically limited as long as being exchangeable with the amide groups of Component (A), but is preferable to have any one of OH group, NH group and SH group.

Aliphatic alcohols, aromatic alcohol, etc. may be used as specific compounds, in particular, as those having OH group. Specifically, the compounds that may be use includes, but is not limited to, 2-ethyl-1-hexanol, dibutyl hydroxy toluene, alkylated phenol, 4,4'-thiobis-(6-t-butyl-3-methylphenol), 4,4'-butylidenebis-(6-t-butyl-3-methylphenol), 2,2'-methylenebis-(4-methyl-6-t-butylphenol), 2,2'-methylenebis-(4-ethyl-6-t-butylphenol), 2,6-di-t-4-ethylphenol, 1,1,3-tris-(2-methyl-4-hydroxy-5-t-butylphenyl)butane, n-octadecyl-3-(4-hydroxy-3,5-di-t-butylphenyl)propionate, tetrakis[methylene-3-(3,5-di-t-butyl-4-hydroxyphenyl)propionate]methane, dilauryl thiodipropionate, distearyl thiodipropionate, dimyristyl thiopropionate, etc. For example, triethylene glycol-bis[3-(3-t-butyl-5-methyl-4-hydroxyphenyl)propionate], 1,6-hexanediol-bis[3-(3,5-di-t-butyl-4-hydroxyphenyl)propionate], 2,4-bis(n-octylthio)-6-(4-hydroxy-3,5-di-t-butylanilino)-1,3,5-triazine, pentaerythritol-tetrakis[3-(3,5-di-t-butyl-4-hydroxyphenyl)propionate], 2,2-thio-diethylenebis[3-(3,5-di-t-butyl-4-hydroxyphenyl)propionate], octadecyl-3-(3,5-di-t-butyl-4-hydroxyphenyl)propionate], N,N'-hexamethylenebis(3,5-di-t-butyl-4-hydroxy-hydrocinnamamide), 3,5-t-butyl-4-hydroxybenzene phosphonate-diethyl ester, 1,3,5-trimethyl-2,4,6-tris(3,5-di-t-butyl-4-hydroxybenzyl)benzene, tris-(3,5-di-t-butyl-4-hydroxybenzyl)-isocyanurate, octylated diphenylamine, 2,4-bis[(octylthio)methyl]-o-cresol, etc. may be further used as hindered phenols.

In addition, as a hydrazine, N,N'-bis[3-(3,5-di-t-butyl-4-hydroxyphenyl)propionyl]hydrazine may be used.

As those having NH group, primary amines or secondary amines such as alkylamine, arylamine, etc. may be used. Specifically, dimethylamine, diethylamine, pyrrole, ethanolamine, diethanolamine, dicyclohexylamine, N,N'-dibenzyl-ethylenediamine, bis(2-diphenylphosphinophenyl)amine, etc. may be used.

As those having SH group, aliphatic thiols, aromatic thiols, etc. and compounds represented by the following general formula (I) and (II) may be used:

[Formula I]

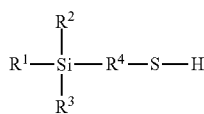

(I)

(in the formula, $R^1$, $R^2$ and $R^3$ are independent to each other and are represented by $-O-C_jH_{2j+1}$, $-(O-C_kH_{2k}-)_a-O-C_mH_{2m+1}$ or $-C_nH_{2n+1}$, where at least one of $R^1$, $R^2$ and $R^3$ is $-(O-C_kH_{2k}-)_a-O-C_mH_{2m+1}$, j, m and n are independent to each other and may be 0 to 12, k and a are independent to each other and may be 1 to 12, $R^4$ has 1 to 12 carbon atoms, and may be linear, branched or cyclic, saturated or unsaturated, for example, alkylene group, cycloalkylene group, cycloalkylalkylene group, cycloalkenyl alkylene group, alkenylene group, cycloalkenylene group, a cycloalkyl alkenylene group, a cycloalkenyl alkenylene group, an arylene group or aralkylene group).

As specific examples of those represented by general formula (I), 3-mercaptopropyl trimethoxysilane, 3-mercaptopropyl-triethoxysilane, 3-mercaptopropylmethyldimethoxysilane, (mercaptomethyl)dimethylethoxysilane, (mercaptomethyl)dimethylethoxysilane, mercaptomethyl trimethoxysilane, etc. may be used:

[Formula II]

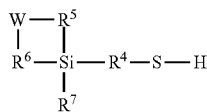

(II)

(in the formula, W is represented by $-NR^8-$, $-O-$ or $-CR^9R^{10}-$ (here, $R^8$ and $R^9$ are $-C_pH_{2p+1}$, $R^{10}$ is $-C_qH_{2q+1}$, p and q are independent to each other and are 0 to 20), $R^5$ and $R^6$ are independent to each other and are represented by $-M-C_rH_{2r}-$ (here, M is $-O-$ or $-CH_2-$, and r is 1 to 20), $R^7$ is represented by $-O-C_jH_{2j+1}$, $-(O-$ $C_kH_{2k}$—)$_a$—O—$C_mH_{2m+1}$ or —$C_nH_{2n+1}$, j, m and n are independent to each other and are 0 to 12, k and a are independently 1 to 12, $R^4$ has 1 to 12 carbon atoms and may be linear, branched or cyclic, saturated or unsaturated, for example, alkylene group, cycloalkylene group, cycloalkylalkylene group, cycloalkenyl alkylene group, alkenylene group, cycloalkenylene group, cycloalkyl alkenylene group, cycloalkenyl alkenylene group, arylene group or aralkylene group).

As specific examples for those represented by general formula (II), 3-mercaptopropyl(ethoxy)-1,3-dioxa-6-methylaza-2-silacyclooctane, 3-mercaptopropyl(ethoxy)-1,3-dioxa-6-butylaza-2-silacyclooctane, 3-mercaptopropyl (ethoxy)-1,3-dioxa-6-dodecylaza-2-silacyclooctane, etc. may be used.

As Additive D, it is preferable to use an anionic tridentate ligand precursor represented by the following general formula (ii):

$$E^1\text{-}T^1\text{-}Q\text{-}T^2\text{-}E^2 \qquad \text{(ii)}$$

(Q represents an anionic electron-donating group comprising coordinating atoms selected form Group 15 of the Periodic Table, $E^1$ and $E^2$ are independent to each other and represent neutral electron-donating groups comprising coordinating atoms selected from Group 15 and Group 16 of the Periodic Table, and $T^1$ and $T^2$ each represent a crosslinking group crosslinking Q to $E^1$ and to $E^2$).

Additive D is preferably added 0.01 to 10 mol, and more preferably added 0.1 to 1.2 mol with respect to 1 mol of the rare-earth element compound. In the case that the adding amount is less than 0.1 mol, the polymerization of monomer becomes difficult to proceed, and the purpose of the present invention is difficult to achieve. The adding amount is preferably an equivalent of the rare-earth element compounds (1.0 mol), but may also be added in an excessive amount. However, in addition, the adding amount is not preferable to exceed 1.2 mol, because the loss of samples would be large.

In the aforementioned general formula (ii), neutral electron-donating groups $E^1$ and $E^2$ are groups comprising coordinating atoms selected from Group 15 and Group 16. In addition, $E^1$ and $E^2$ may be the same group or different groups. As the coordinating atom, nitrogen N, phosphorus P, oxygen O, sulfur S, etc. may be used, whereamong P is preferable.

In the case that the coordinating atom comprised in the $E^1$ and $E^2$ is P, as the neutral electron-donating group $E^1$ or $E^2$, 1) diarylphosphino groups such as diphenylphosphino group or ditolylphosphino group, etc., 2) dialkylphosphino groups such as dimethylphosphino group or diethylphoshpino group, etc., and 3) alkylarylphosphino groups such as methylphenylphosphino group, etc. may be used, and diarylphosphino group is preferably used.

In the case that the coordinating atom comprised in the $E^1$ and $E^2$ is N, as the neutral electron-donating group $E^1$ or $E^2$, 1) dialkylamino groups such as dimethylamino group, diethylamino group or bis(trimethylsilyl)amino group, etc., 2) diarylamino groups such as diphenylamino group, etc., and 3) alkylarylamino groups such as methylphenyl group, etc. may be used.

In the case that the coordinating atom comprised in the $E^1$ and $E^2$ is O, as the neutral electron-donating group $E^1$ or $E^2$, 1) alkoxy groups such as methoxy group, ethoxy group, propoxy group, butoxy group, etc., 2) aryloxy groups such as phenoxy group, 2,6-dimethylphenoxy group, etc. may be used.

In the case that the coordinating atom comprised in the $E^1$ and $E^2$ is S, as the neutral electron-donating group $E^1$ or $E^2$, 1) alkylthio groups such as methylthio group, ethylthio group, propylthio group, butylthio group, etc., 2) arylthio groups such as phenylthio group, trylthio group, etc. may be used.

The anionic electron-donating group Q is a group comprising coordinating atoms selected from Group 15. As the coordinating atom, phosphorus P or nitrogen N is preferably used, and N is more preferably used.

The crosslinking groups $T^1$ and $T^2$ may be any group that is possible to crosslink Q to $E^1$ and to $E^2$, and an arylene group which may comprise a substituent group on the aryl ring may be used. In addition, $T^1$ and $T^2$ may be the same group or different groups.

The arylene group may be phenylene group, naphthylene group, pyridylene group, thienylene group (preferably phenylene group and naphthylene group), etc. In addition, any group may be substituted on the aryl ring of the arylene group. As the substituent group, alkyl groups such as methyl group, ethyl group, etc., aryl groups such as phenyl group, tolyl group, etc., halogen groups such as fluoro, chloro, bromo, etc., and silyl groups such as trimethylsilyl group may be used.

As the arylene group, 1,2-phenylene group is more preferably used.

The anionic tridentate ligand precursor in the metal complex constituting the polymerization catalyst composition may be produced, for example, by referring to Organometallics, 23, p 4778-4787 (2004), etc. More specifically, bis(2-diphenylphosphinophenyl)amine (PNP) ligand may be used.

(Rubber Composition)

The rubber composition of the present invention comprises at least rubber components, and may further comprise other components such as filler, crosslinking agent, etc., depending on the purpose.

—Rubber Component—

The rubber component comprises at least the polybutadiene produced with the method of the present invention, and may further comprise other rubber components depending on the purpose.

The content of the polybutadiene in the rubber components is not limited in particular, and may be selected appropriately depending on the purpose, which is preferably 15 mass % to 100 mass %.

By setting the content of the polybutadiene in the rubber components to be 15 mass % or more, the properties of the polybutadiene may be achieved sufficiently.

—Other Rubber Components—

The other rubber components are not limited in particular, and may be selected appropriately depending on the purpose; for example, isoprene rubber (BR), styrene-butadiene rubber (SBR), acrylonitrile-butadiene rubber (NBR), chloroprene rubber, ethylene-propylene rubber (EPM), ethylene-propylene-non-conjugated diene rubber (EPDM), polysulfide rubber, silicone rubber, fluororubber, urethane rubber, isoprene copolymer, etc. may be used. The rubbers above may be used singly or in a combination of two or more.

—Filler—

The filler is not limited in particular, and may be selected appropriately depending on the purpose; for example, carbon black, inorganic filler, etc. may be used, and at least one selected from carbon black and inorganic filler is preferably used. Here, the rubber composition is more preferable to comprise carbon black. Further, the filler is compound to the rubber composition in order to improve the reinforcing properties, etc.

The content of the filler is not limited in particular, and may be selected appropriately depending on the purpose; with respect to 100 parts by mass of rubber component, 10 parts by mass to 100 parts by mass is preferable, 20 parts by mass to 80 parts by mass is more preferable, and 30 parts by mass to 60 parts by mass is even more preferable.

By setting the content of the filler to be 10 parts by mass or more, the effect of adding filler is observed, and by setting the same to be 100 parts by mass or less, it is possible to mix the filler into the rubber component, and it is possible to improve the performance as a rubber composition.

On the other hand, by setting the content of the filler to be within the more preferable range, or the even more preferable range, the balance between workability and low loss property and between workability and durability would be improved.

—Carbon Black—

The carbon black is not limited in particular, and may be selected appropriately depending on the purpose; for example, FEF, GPF, SRF, HAF, N339, IISAF, ISAF, SAF, etc. may be used. The carbon blacks above may be used singly or in a combination of two or more.

The nitrogen adsorption specific surface area ($N_2SA$, measured according to JIS K 6217-2:2001) of the carbon black is not limited in particular, and may be selected appropriately depending on the purpose; 20 $m^2/g$ to 100 $m^2/g$ is preferable, and 35 $m^2/g$ to 80 $m^2/g$ is more preferable.

In the case that the nitrogen adsorption specific surface area ($N_2SA$) of the carbon black is lower than 20 $m^2/g$, the durability of the obtained rubber becomes low, and may not obtain sufficient crack growth resistance; if the same is more than 100 $m^2/g$, the low loss property becomes low and the workability deteriorates.

The content of the carbon black with respect to 100 parts by mass of rubber components is not limited in particular, and may be selected appropriately depending on the purpose; 10 parts by mass to 100 parts by mass is preferable, 10 parts by mass to 70 parts by mass is more preferable, and 20 parts by mass to 60 parts by mass is even more preferable.

If the content of the carbon black is less than 10 parts by mass, the reinforcing properties would become insufficient which may cause the deterioration of the fracture resistance; if the content is more than 100 parts by mass, the workability and the low loss property may deteriorate.

On the other hand, it would be advantageous for the balance of each performance by setting the content of the carbon black within the more preferable range or the even more preferable range.

—Inorganic Filler—

The inorganic filler is not limited in particular, and may be selected appropriately depending on the purpose; for example, silica, aluminum hydroxide, clay, alumina, talc, mica, kaolin, glass balloon, glass beads, calcium carbonate, magnesium carbonate, magnesium hydroxide, calcium carbonate, magnesium oxide, titanium oxide, potassium titanate, barium sulfate, etc. may be used. The inorganic fillers above may be used singly or in a combination of two or more.

Further, when using an inorganic filler, a silane coupling agent may also be used appropriately.

—Crosslinking Agent—

The crosslinking agent is not limited in particular, and may be selected appropriately depending on the purpose; for example, sulfur-based crosslinking agent, organic peroxide-based crosslinking agent, inorganic crosslinking agent, polyamine crosslinking agent, resin crosslinking agent, sulfur compound-based crosslinking agent, oxime-nitrosamine-based crosslinking agent, etc. may be used, whereamong sulfur-based crosslinking agent is more preferable for a rubber composition for tire.

The content of the crosslinking agent is not limited in particular, and may be selected appropriately depending on the purpose; with respect to 100 parts by mass of rubber components, 0.1 part by mass to 20 parts by mass is preferable.

If the content of the crosslinking agent is less than 0.1 parts by mass, the crosslinking would hardly progress, and if the content is more than 20 parts by mass, there would be a tendency that the crosslinking progresses during the kneading due to a part of the crosslinking agent, causing a loss of the physical properties of the vulcanizate.

—Other Components—

The rubber composition of the present invention may be also used with vulcanization accelerators in addition; as the vulcanization accelerator, compounds which are guanidine-based, aldehyde-amine-based, aldehyde-ammonia-based, thiazole-based, sulfenamide-based, thiourea-based, thiuram-based, dithiocarbamate-based, xanthate-based, etc. may be used.

In addition, depending on the purpose, conventional means such as softening agent, vulcanization assistant, colorant, flame retardant, lubricant, foaming agent, plasticizer, processing aid, antioxidant, age resister, anti-scorch agent, ultraviolet rays protecting agent (ultraviolet inhibitor), antistatic agent, color protecting agent, and other compounding agents may be used depending on the purpose.

(Crosslinking Rubber Composition)

The rubber composition of the present invention may be subjected to crosslinking and used as a crosslinking rubber composition. The crosslinking rubber composition may be of any type that is obtained by crosslinking the rubber composition of the present invention, which is not limited in particular, and may be selected appropriately depending on the purpose.

The crosslinking condition is not limited in particular, and may be selected appropriately depending on the purpose; a temperature of 120° C. to 200° C. and a heating time of 1 minute to 900 minutes are preferable.

(Tire)

The tire of the present invention may be of any type that uses the crosslinking rubber composition obtained by crosslinking the rubber composition of the present invention, which is not limited in particular, and may be selected appropriately depending on the purpose.

The applying position on the tire of the rubber composition of the present invention or the crosslinking rubber composition of the present invention is not limited in particular, and may be selected appropriately depending on the purpose; for example, rubber members such as tread, base tread, sidewall, side-reinforcing rubber and bead filler may be used.

Among the above, by setting a tread as the applying position, it would be advantageous to the durability.

Conventional methods may be used as the method for producing the tire. For example, a green tire is obtained by pasting overlappingly in sequence members normally used for producing tires such as carcass layer, belt layer, tread layer, etc. consisting unvulcanized rubber and/or cord on the tire molding drum, and then removing the drum. Next, a desired tire (for example, a pneumatic tire) may be produced by subjecting the green tire to heating vulcanization according to a conventional method.

(Usages Other than Tire)

Besides the usage in tire, the rubber composition of the present invention, or the crosslinking rubber composition of the present invention may also be used in vibration-proof rubber, seismic isolation rubber, belt (conveyor belt), rubber crawler, various hoses, etc.

EXAMPLES

The present invention will be explained in further detail below according to examples, although the present invention is not limited to the disclosed examples.

Test Example 1

Producing of Polybutadiene

Example 1

A Method for Producing a Polybutadiene 1 (without Additive D)

In this case, 12.0 μmol of trisbistrimethylsilylamide gadolinium ($Gd[N(SiMe_3)_2]_3$), 0.90 mmol of triisobutyl aluminum and 15.0 g of toluene were added into an 1 L pressure-resistant grass reactor in a glovebox under a nitrogen atmosphere and afterwards subjected to ripening for 30 minutes. Next, 12.0 μmol of triphenyl carbonium tetrakis(pentafluorophenyl)borate ($Ph_3CB(C_6F_5)_4$) was added and afterwards subjected to ripening for 30 minutes. The reactor was removed out of the glovebox, and 200.0 g of 15 mass % butadiene/cyclohexane solution was added, and then subjected to polymerization at 80° C. for 15 hours. After the polymerization, a polybutadiene 1 was obtained by adding 1 mL of an isopropanol solution with 5 mass % of 2,2'-methylene-bis(4-ethyl-6-t-butylphenol) (NS-5) to stop the reaction, and separating the polymer with a large amount of methanol and vacuum drying the same at 70° C. The yield of the obtained polybutadiene 1 was 27.0 g.

Example 2

A Method for Producing a Polybutadiene 2 (Equivalent to 0.5 mol of PNP)

In this case, 12.0 μmol of trisbistrimethylsilylamide gadolinium ($Gd[N(SiMe_3)_2]_3$), 0.6 mL of 0.01M PNP/toluene solution (Additive D), 0.90 mmol of triisobutyl aluminum and 15.0 g of toluene were added into an 1 L pressure-resistant grass reactor in a glovebox under a nitrogen atmosphere and then subjected to ripening for 30 minutes. Next, 12.0 μmol of triphenyl carbonium tetrakis(pentafluorophenyl)borate ($Ph_3CB(C_6F_5)_4$) was added and afterwards subjected to ripening for 30 minutes. The reactor was removed out of the glovebox, and 200.0 g of 15 mass % butadiene/cyclohexane solution was added, and then subjected to polymerization at 80° C. for 15 hours. After the polymerization, a polybutadiene 2 was obtained by adding 1 ml of an isopropanol solution with 5 mass % of 2,2'-methylene-bis(4-ethyl-6-t-butylphenol) (NS-5) to stop the reaction, and separating the polymer with a large amount of methanol and vacuum drying the same at 70° C. The yield of the obtained polybutadiene 2 was 27.0 g.

Example 3

A Method for Producing a Polybutadiene 3 (Equivalent to 1.0 mol of PNP)

In this case, 12.0 μmol of trisbistrimethylsilylamide gadolinium ($Gd[N(SiMe_3)_2]_3$), 1.2 mL of 0.01M PNP/toluene solution (Additive D), 0.90 mmol of triisobutyl aluminum and 15.0 g of toluene were added into an 1 L pressure-resistant grass reactor in a glovebox under a nitrogen atmosphere and then subjected to ripening for 30 minutes. Next, 12.0 μmol of triphenyl carbonium tetrakis(pentafluorophenyl)borate ($Ph_3CB(C_6F_5)_4$) was added and afterwards subjected to ripening for 30 minutes. The reactor was removed out of the glovebox, and 200.0 g of 15 mass % butadiene/cyclohexane solution was added, and then subjected to polymerization at 80° C. for 15 hours. After the polymerization, a polybutadiene 3 was obtained by adding 1 ml of an isopropanol solution with 5 mass % of 2,2'-methylene-bis(4-ethyl-6-t-butylphenol) (NS-5) to stop the reaction, and separating the polymer with a large amount of methanol and vacuum drying the same at 70° C. The yield of the obtained polybutadiene 3 was 26.0 g.

Example 4

A Method for Producing a Polybutadiene 4 (Equivalent to 1.0 mol of 2-ethyl-1-hexanol)

Similarly to Example 2 except that 2-ethyl-1-hexanol was used instead of PNP as Additive D, a polybutadiene 4 was obtained. The yield of the obtained polybutadiene 4 was 25.5 g.

Example 5

A Method for Producing a Polybutadiene 5 (Equivalent to 1.0 mol of 3-mercaptopropyltriethoxysilane)

Similarly to Example 2 except that 3-mercaptopropyltriethoxysilane was used instead of PNP as Additive D, a polybutadiene 5 was obtained. The yield of the obtained polybutadiene 5 was 26.5 g.

Test Example 2

Analysis on Each Polybutadiene

Each of the aforementioned polybutadienes was analyzed as follows. The analysis result of the polybutadienes is as shown in Table 1.

(1) Micro Structure (Cis-1,4 Bonding Amount)

The integral ratio of the peaks obtained with $^1$H-NMR and $^{13}$C-NMR [$^1$H-NMR: δ4.6-4.8 (the $=CH_2$ of 3,4-vinyl unit), 5.0-5.2 (the $—CH=$ of 1,4-unit), $^{13}$C-NMR: [δ23.4 (1,4-cis unit), 15.9 (1,4-trans unit) and 18.6 (3,4-unit)] were calculated respectively. In addition, the number average molecular weight (Mn) and the molecular weight distribution (Mw/Mn) were calculated with GPC, using the polystyrenes as standard substance.

(2) Number Average Molecular Weight (Mn) and Molecular Weight Distribution (Mw/Mn)

Using Gel Permeation Chromatography [GPC: HLC-8220GPC made by Tosoh Corporation, column: $GMH_{XL}$ made by Tosoh Corporation-two, detector: differential refractometer (RI)] and on the basis of monodisperse polystyrene, the number average molecular weight (Mn) converting to polystyrene and the molecular weight distribution (Mw/Mn) of the polybutadienes were calculated. Further, the measuring temperature was set to be 40° C. THF was used as an elution solvent.

TABLE 1

| | Additive D mol equivalent | Yield % | Mn × 10³ | Mw/Mn | Cis-1,4 bonding amount (%) | Vinyl-1,2 bonding amount (%) |
|---|---|---|---|---|---|---|
| Example 1 | 0.0 | 90 | 76.45 | 2.55 | 83.76 | 2.20 |
| Example 2 | 0.5 | 90 | 135.3 | 2.42 | 90.81 | 1.78 |
| Example 3 | 1.0 | 87 | 400.4 | 1.74 | 94.36 | 1.46 |
| Example 4 | 1.0 | 85 | 402.1 | 1.71 | 92.1 | 1.63 |
| Example 5 | 1.0 | 88 | 356.1 | 1.95 | 93.3 | 1.55 |

According to the result in Table 1, in Examples 1 to 5, it is shown that polybutadienes were synthesized at a high yield (a yield of 80% or more). Further, it is shown that it is possible to synthesize a polybutadiene with a high cis-1,4 bonding amount at a high yield by adding additive D.

INDUSTRIAL APPLICABILITY

A polybutadiene produce with the method of the present invention and a rubber composition comprising the polybutadiene is preferably used, for example, in a tire component (in particular, a tire tread component).

The invention claimed is:

1. A method for producing a polybutadiene,
wherein a butadiene monomer is polymerized with the existence of rare-earth element compounds (A) and an additive (D) which is a precursor of an anionic ligand,
wherein the compounding ratio of the additive (D) is 0.1 mol or more to less than 1 mol with respect to 1 mol of the rare-earth element compounds (A),
wherein the additive (D) is an anionic tridentate ligand precursor having at least one selected from the group consisting of SH group and NH group and
wherein the rare-earth element compounds (A) are represented by the following formula (i):

$$M\text{-}(NQ)^1(NQ)^2(NQ)^3 \quad (i)$$

in the formula, M is at least one selected from lanthanides, scandium and yttrium; $(NQ)^1$, $(NQ)^2$ and $(NQ)^3$ are amide groups which may be the same or different to each other, and have M-N bonds.

2. The method for producing a polybutadiene of claim 1, where the butadiene monomer is polymerized with the existence of component (B) and compounds (C) in addition to the rare-earth element compounds (A) and the additive (D),
wherein the component (B) is at least one selected from the group consisting of ionic compounds and halogen compounds and
wherein the compounds (C) are represented by the following general formula (X):

$$YR^1_a R^2_b R^3_c \quad (X)$$

in the formula, Y is a metallic element selected from Group 1, Group 2, Group 12 or Group 13 of the Periodic Table, $R^1$ and $R^2$ are hydrocarbon group having 1 to 10 carbon atoms or hydrogen atom, $R^3$ is a hydrocarbon group having 1 to 10 carbon atoms, where $R^1$, $R^2$ and $R^3$ may be the same or different from each other; in addition, in the case that Y is a metallic element selected from Group 1 of the Periodic Table, a=1 and b, c=0; in the case that Y is a metallic element selected from Group 2 and Group 12 of the Periodic Table, a, b=1 and c=0; and in the case that Y is a metallic element selected from Group 13 of the Periodic Table, a, b, c=1.

3. The method for producing a polybutadiene of claim 1, wherein cyclohexane, normal hexane or a mixture thereof is used as a solvent for the polymerization.

4. A polybutadiene produced with the method for producing a polybutadiene of claim 1, wherein a 1,2-vinyl bonding amount is 2% or less.

5. A rubber composition comprising rubber components which comprise at least the polybutadiene of claim 4.

6. A tire comprising a rubber member using the rubber composition of claim 4.

7. A polybutadiene produced with the method for producing a polybutadiene of claim 2, wherein a 1,2-vinyl bonding amount is 2% or less.

8. A polybutadiene produced with the method for producing a polybutadiene of claim 3, wherein a 1,2-vinyl bonding amount is 2% or less.

* * * * *